United States Patent [19]

Kotaka et al.

[11] Patent Number: 5,406,625
[45] Date of Patent: Apr. 11, 1995

[54] RECEIVING APPARATUS AND RECORDING METHOD

[75] Inventors: Yoshikazu Kotaka; Toru Minematsu; Nobuo Namekawa, all of Kanagawa, Japan

[73] Assignee: Sony Corporation, Tokyo, Japan

[21] Appl. No.: 974,794

[22] Filed: Nov. 12, 1992

[30] Foreign Application Priority Data

Nov. 22, 1991 [JP] Japan .................... 3-332953

[51] Int. Cl.⁶ ............................................. H04L 9/00
[52] U.S. Cl. .................................... 380/9; 380/2;
380/3; 380/5; 380/10; 358/335; 360/31;
360/69; 369/19; 369/53
[58] Field of Search .......................... 380/2–5,
380/7, 10, 820, 6, 9; 360/31, 69; 369/19, 20, 53;
358/335, 337

[56] References Cited

U.S. PATENT DOCUMENTS 4,635,112  1/1987  Tomioka et al. .................... 380/20
4,706,121  11/1987  Young .............................. 358/146

FOREIGN PATENT DOCUMENTS 0338866  10/1989  European Pat. Off. ........ H04N 5/91
0508394  10/1992  European Pat. Off. ........ H04N 7/16
2218287  11/1989  United Kingdom ........... H03J 5/00

*Primary Examiner*—Bernarr E. Gregory
*Attorney, Agent, or Firm*—Jay H. Maioli

[57] ABSTRACT

A determination is made whether recording by a recording apparatus is or is not feasible. This determination is made on the basis of whether or not scrambled reception signals can be descrambled. Recording is discontinued when it is determined that descrambling is not feasible. This prevents wasteful recording. A user can check visually and/or audibly to see whether or not descrambling has been effected. The user is thereby apprised of whether or not recording is carried out.

9 Claims, 5 Drawing Sheets

RECEIVING APPARATUS AND RECORDING METHOD

BACKGROUND OF THE INVENTION

1. Field of the Invention

This invention relates to a receiving apparatus for receiving television broadcast signals of a so-called chargeable broadcasting system, and a recording method.

2. Description of the Prior Art

The conventional chargeable broadcasting system for e.g. television broadcasting is a system in which viewers desire to view particular broadcasting and conclude a fee-paying reception contract with the broadcasting company to receive broadcasting services and is called a pay service, pay television or limited reception system.

In a broadcasting system over a cable, such as a cable television system (CATV), belonging to the chargeable broadcasting system, reception can be controlled by cable connection. However, on radio or cable-less broadcasting, the same electric waves also arrive at a non-subscriber. For this reason, broadcast signals are scrambled so that the program may not be viewed by non-subscribers. Besides, if a particular program is charged in CATV by a particular charging system, means for scrambling signals is similarly required. If the signals are scrambled in this manner, the contracting subscribers receive regular program signals using a decoder.

The above-mentioned chargeable broadcasting is put to practical use by e.g. a pay cable for a cable system and by e.g. a subscription television (STV) for a surface radio system. Broadcasting by a direct broadcasting satellite is under investigation. When the program supplying company distributes head-end CATV programs of a number of territories by communication satellites, scrambling is introduced for preventing reception by non-subscribers.

It is noted that signal scrambling is frequently controlled by pseudo random (PN) signal series (scrambling signal series) for elevating safety. The receiving side descrambles the scrambled signals using the same signal series (in this case, descrambling series) for reproducing the original signals. Scramble keys are sent to the receiving side for generating the PN signal series.

Besides, it is necessary with the chargeable broadcasting system to control descrambling based on the contents of the contract of the respective subscribers, such as services, contract terms or prepaid amounts. The information required for this purpose is also transmitted to the receiver.

The information for controlling scramble keys or chargeable broadcasting is termed the pertinent information. The media used for transmission of the pertinent information include physical media such as a wireless medium by electric waves, a magnetic card or IC card, and cable media such as telephone lines. These media are different in their characteristics, such as rates of transmission, volume of information, reliability in transmission and bidirectivity.

Transmission of personal information to each receiver by electric waves is generally termed addressing by electric waves. When the personal information is transmitted by electric waves, high transmission reliability is of utmost importance because scrambled broadcasting signals cannot be descrambled unless the pertinent information is received, and some information is direct monetary information.

It is noted that the pertinent information in the current television scrambling transmission system may be typified by, for example, program information containing the information concerning the program and the scramble key, control information for instructing forced on/off of the descrambling function of the decoder, personal information having a work key for decoding the contract information and the common information (i.e. both the program information and the control information) for each subscriber and message information for additionally displaying the information concerning the chargeable broadcasting services at the receiving side. It is noted that the personal information is coded by a master key allocated to each subscriber when the information is distributed by electric waves. The pertinent information is transmitted by electric waves by packet transformation over data channels.

The pertinent information in the scrambling transmission system for high definition television system is the information similar to the above-mentioned current television scrambling transmission system and is transmitted by electric waves by packet transmission over data channels.

Meanwhile, if the usual receiver for chargeable broadcasting is combined with e.g. a video tape recorder or a cassette tape recorder and the chargeable broadcasting is to be recorded by these recorders, the recorders record the signals no matter whether the signals, which are in the scrambled state, may be descrambled or not.

If the signals are recorded in the non-descrambled state, and reproduced subsequently, the signals recorded on the video tape recorder become striped patterns with no sound reproduction, while those recorded on the cassette tape recorders become silent signals. In other words, the program has not been recorded on the tape.

Above all, in the case of appointment recording using a timer or take-care recording for absence, recording is not made with the user actually checking the state or contents of recording. On the other hand, when setting the appointment recording or take-care recording for absence, it may occur that the program channel or broadcasting time and, in the case of satellite broadcasting, the particular satellite (if there are plural satellites) or the scrambling contract conditions, may be set in a mistaken manner by the user.

In such case, there is a risk that, even if the user feels that recording has been made as he set, recording is actually not made. Such risk is particularly high when only a certain program becomes chargeable in accordance with a pay-per program contract.

OBJECT AND SUMMARY OF THE INVENTION

In view of the above-described status of the art, it is an object of the present invention to provide a receiving apparatus and a recording method in which, when the receiving apparatus is combined with recording apparatus, such as video tape recorders or cassette tape recorders, it becomes possible to prevent mistaken recording from being produced as a consequence of failure in descrambling.

In accordance with the present invention, there is provided a receiving apparatus for receiving scrambled signals and for supplying received signals to a recording apparatus connected thereto, said receiving apparatus comprising descrambling means for descrambling said scrambled signals, means for deciding whether or not said scrambled signals can be descrambled, and means for controlling a recording operation of said recording apparatus based on the results of decision by said decision means.

That is, in the receiving apparatus and the recording method according to the present invention, if, with the recording apparatus being set to the recording mode, the result of decision by decision means become negative, the controlling means display the effect that the descrambling has not been feasible on display means as visual recognition means or issue an alarm by issuing an alarm sound by pronunciation means for audible recognition, while aborting the recording operation by the recording apparatus. Besides, if the recording apparatus is in the timer recording mode, and the result of decision becomes negative when the timer times out to initiate recording, the control means discontinues the timer recording to cause the message of that effect to persist.

In other words, the receiving apparatus according to the present invention is so arranged that, when the program of e.g. a chargeable broadcasting is to be recorded by timer recording by a video tape recorder or a cassette tape audio recorder, the program is prevented from being recorded if descrambling has not been achieved when the recording state is initiated. In this case, a warning by e.g. an alarm signal is issued to discontinue the recording or to cause the recording history to persist. That is, by issuing the above warning, the user is in a position of taking some measures if present on the spot. On the other hand, if the user is not present on the spot, the tape or the head may be prevented from being used up by discontinuing the recording. Besides, by causing the recording history to persist, the user may be apprised of what happened subsequently.

With the receiving apparatus and the recording method according to the present invention, the operation of the recording apparatus connected to the receiving apparatus may be controlled based on the results of decision of the decision means and the recording by the recording apparatus may be discontinued if, for example, the result of decision is negative, for preventing wasteful recording. Besides, the user may be apprised of the fact that descrambling has not been made based on the visual and/or audible recognition of the results of decision. Thus the receiving apparatus according to the present invention comprises descrambling means for descrambling said scrambled signals, means for deciding whether or not the scrambled signals can be descrambled, and means for enabling visual and/or audible recognition of the results of decision based on the results of decision by the decision means, whereby, in case of combination of the receiving apparatus with the recording apparatus such as a video tape recorder, a cassette tape recorder or DAT, it becomes possible to prevent mistaken video or audio recording otherwise caused by infeasibility of descrambling.

DESCRIPTION OF THE PREFERRED EMBODIMENT

Figure 1:
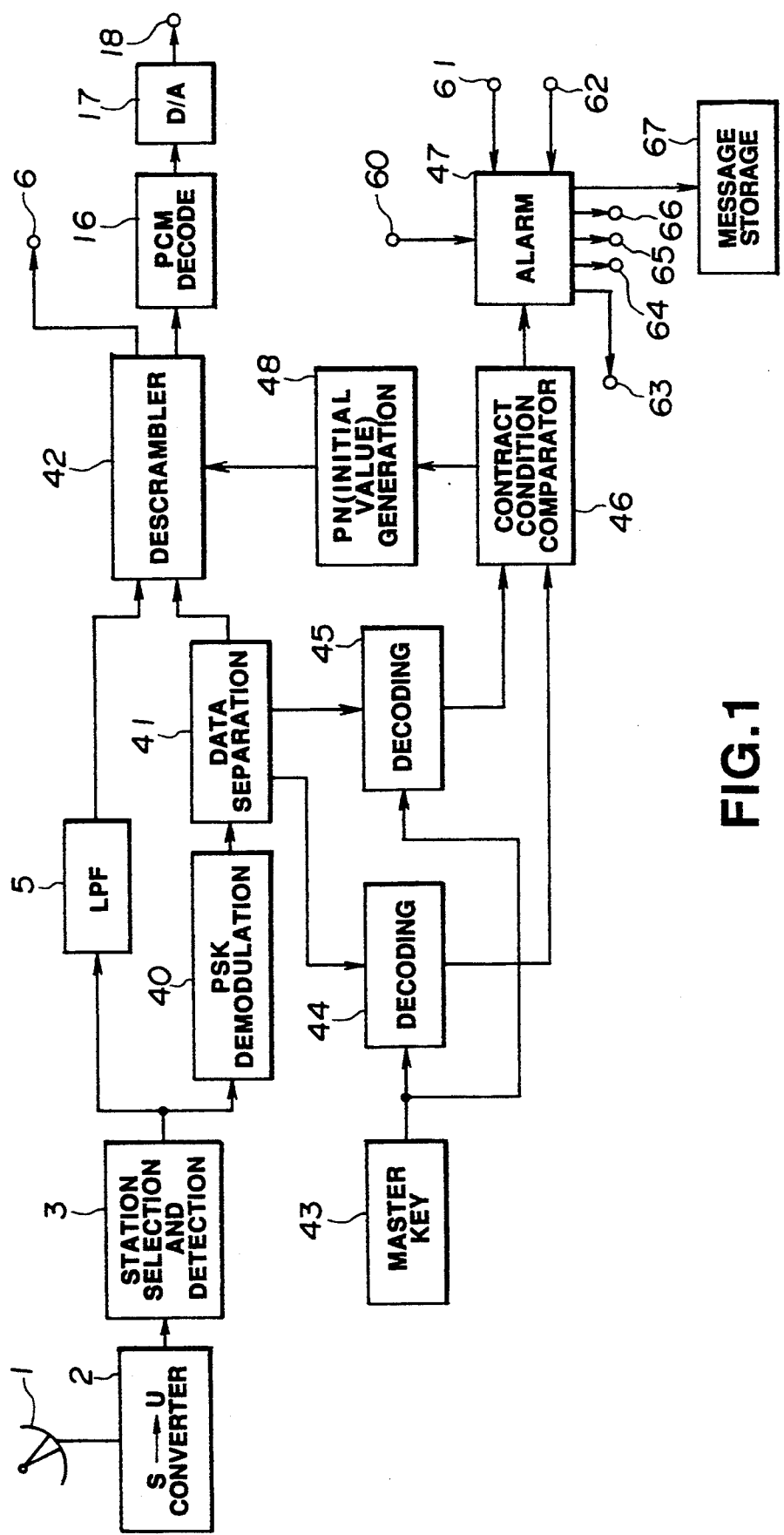
FIG. 1 is a block circuit diagram showing a schematic arrangement of a receiving apparatus according to a first embodiment of the present invention.

Referring to the drawings, certain preferred embodiments of the present invention will be explained in detail.

A receiver according to a first embodiment of the present invention is a receiver for receiving scrambled transmission signals via an antenna 1 for supplying the received signals to a recording apparatus, not shown, connected to the receiver via terminals 6, 18, 65, 66, 61 and 62, as shown for example in FIG. 1. The receiver includes a descrambling circuit (descrambler) for descrambling the received signals, a contract condition comparator circuit 46 for judging if the received signals can be descrambled by the descrambler, and an alarming circuit 47 as controlling and recognition means for controlling the operation of the recording apparatus connected to the receiver based on the results of decision by the contract condition comparator circuit 46 for permitting the user to recognize the results of decision visually and/or audibly.

In the present embodiment, the receiver is a satellite broadcasting receiver, as an example, and the recording apparatus is a video tape recorder (VTR), not shown, as an example. Therefore, in the embodiment illustrated, the satellite broadcasting receiver and the VTR are connected to each other, with terminals 6 and 18 being connected as an example to an image input terminal and an audio input terminal, respectively.

In FIG. 1, scrambled broadcasting signals from a broadcasting satellite are received by antenna 1 so as to be transmitted to an S-U converter 2 which converts the frequency range from an SHF range (12 GHz range) to a UHF range (1 GHz range). That is, the S-U converter 2 converts the weak signals of the frequency range of 12 GHz, collected by antenna 1, into more readily controllable signals of 1 GHz range.

The received signals are transmitted from S-U converter 2 to a station selecting circuit 3 adapted for selecting, from the received signals, one of the channels for the program desired to be viewed.

The one-channel signals selected by the station selecting circuit 3 are supplied via a low-pass filter 5 for extracting television broadcast signal range (image signals) to the descrambler 42 and to a PSK decoder 40 for decoding PSK (phase shift keying) of the supplied signals. That is, the PSK decoder 40 demodulates PSK modulated signals comprising voice signals in the satellite television broadcasting signals transmitted from the broadcasting satellite, in the form of 5.727272 MHz subcarrier signals PSK-modulated with PCM digital signals, descrambling keys for descrambling, and the information necessary for controlling the chargeable broadcasting.

Meanwhile, the pertinent information, which is the above-mentioned scrambling key and the information for controlling the chargeable broadcasting, includes the program information and the scrambling key, control information for instructing the forced on/off of the scrambling function of the decoder, personal information comprising a work key for decoding the contract information for each subscriber and the common information (program information plus control information), and message information for additionally displaying the information concerning the chargeable broadcasting service at the receiver side. It is noted that the personal information is coded by the master key of each subscriber when the personal information is distributed by electric waves.

Outputs of the PSK demodulating circuit 40, that is voice data resulting from PSK demodulation and the above-mentioned pertinent data, are supplied to a data separation circuit 41 in which the voice data and the pertinent data are separated from each other. The separated voice data are transmitted to descrambler 42.

The data separation circuit 41 also separates the pertinent information data into e.g. the personal information data and the common information data which are transmitted to decoders 45, 44, respectively. These decoders 45, 44 perform decoding of the common information and the personal information based on the master key information supplied from master key information generator 43 generating master key information accorded to the particular receiver or user.

The common information and personal information data from decoders 44, 45 are transmitted to contract condition comparator 46 where it is determined whether or not scrambling of received signals is feasible in the descrambler 42. In other words, the contract condition comparator 46 performs an operation of comparing if the common information and the personal information are in meeting with the above-mentioned conditions of reception contract concluded between the owner of the receiver and the supplier of broadcasting signals, that is, broadcasting companies or broadcasting enterprises.

If the results of condition comparison indicate agreement (OK), the contract condition comparator 46 transmits an initial value of a PN code to a PN signal generator 48 generating the PN signal series, that is the pseudo-random (PN) signal series (scrambling signal series). The PN signal generator 48 generates PN signals based on the above-mentioned initial value to transmit the generated PN signals to descrambler 42.

The descrambler 42 descrambles the video signals and the audio signals supplied thereto based on the PN signals to transmit the descrambled video signals and the descrambled voice data to terminal 16 and to PCM decoder 16, respectively. The video signals supplied to terminal 6 are transmitted to video input terminal of the VTR connected to terminal 6. The voice data are PCM-decoded by PCM decoder so as to be converted by D/A (digital to analog converter) 17 before being outputted at terminal 18. The voice signals from terminal 18 are transmitted to voice input terminal of the VTR.

The contract condition comparator 46 transmits signals indicating the results of condition comparison to the alarming circuit 47 which controls the operation of the recording apparatus connected thereto, on the basis of the results in the contract condition comparator 46, while allowing the user to visually and/or audibly recognize the results of decision.

If the result of decision by contract condition comparator 46 is NO, that is if the result of contract comparison indicate non-coincidence, with the VTR being in e.g the recording mode, the alarming circuit 47 indicates to the user that the descrambling has not been possible, on display means as the visual indication, or issues e.g. an alarming sound from pronunciation means, for audio recognition. Besides, the alarming device causes abortion of the recording operation by VTR. If VTR is in a timer recording mode and the results of decision of the condition comparison are NO, the alarming circuit 47 causes the VTR to abort the timer recording while indicating the effect by a corresponding message.

To this end, the alarming circuit 47 generates an alarm sound controlling signal controlling an alarm signal pronunciation means, such as a speaker, to transmit the signal to the alarm sound pronunciation means via terminal 64 to pronunciation means, while also generating message information to the user indicating that descrambling has not been feasible and supplying the message to message storage means 67. The alarming means 47 also generates a recording start control signal controlling the start of recording by VTR to transmit the control signal to VTR, while generating an operation stop control signal controlling the operation stop of VTR to transmit the control signal to VTR via terminal 66. The alarming circuit 47 is supplied with a timer recording mode information for VTR from VTR via terminal 66, a power on/off information for VTR from VTR via terminal 61 and the information from VTR indicating that the VTR is in recording state from terminal 62. The alarming circuit 47 also generates a main power source control signal for on/off control of the main power source for receiver, which control signal is outputted at terminal 63.

Figure 2:
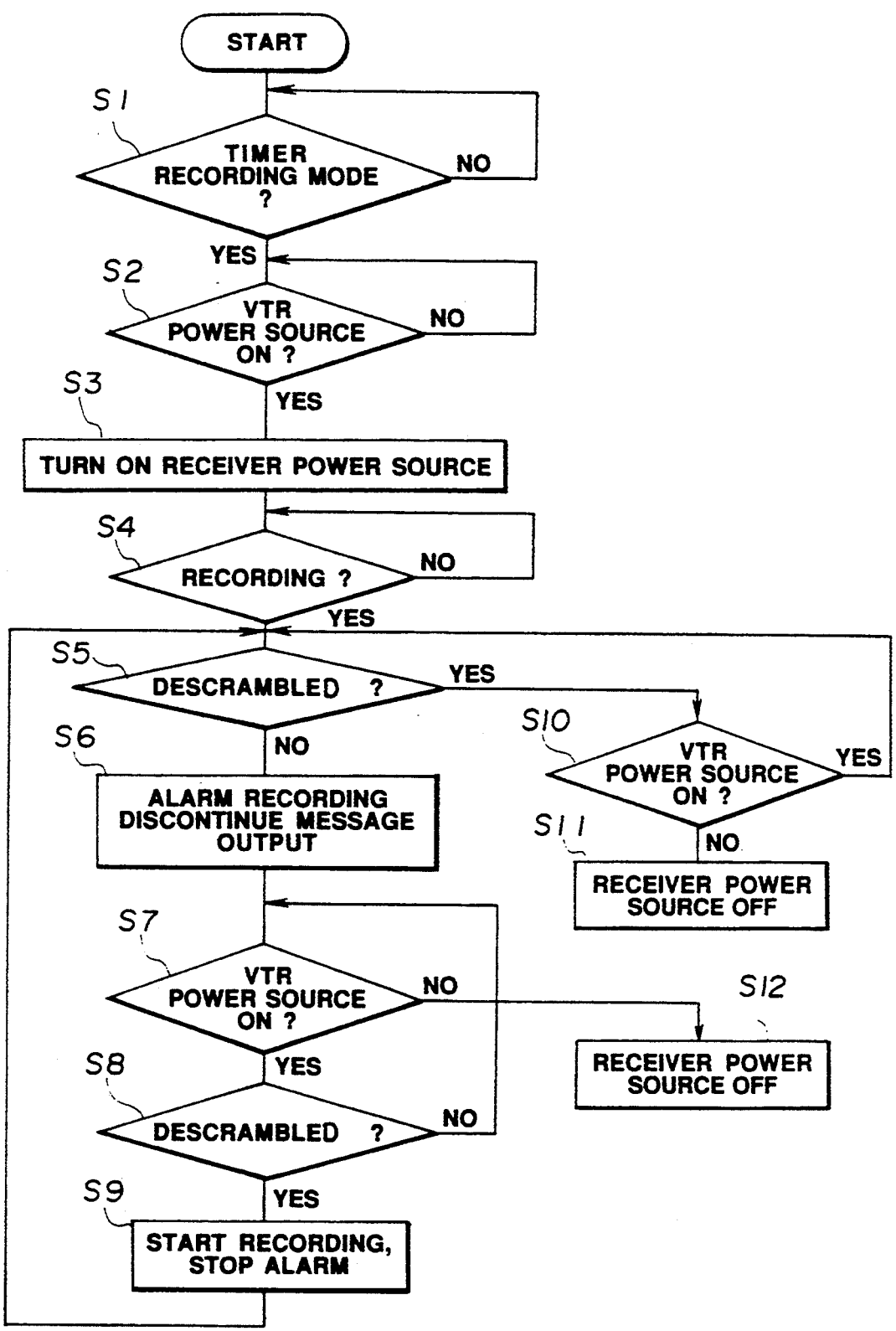
FIG. 2 is a flow chart for illustrating the operation of an alarming circuit of the receiving apparatus shown in FIG. 1.

Concretely, the processing as shown in a flow chart shown in FIG. 2 is carried out in the alarming circuit 47. This flow chart shows the processing in which the VTR is in the recording mode.

In the flow chart shown in FIG. 2, it is checked at step S1 if VTR is in the timer recording mode, based on the timer recording information of VTR supplied via terminal 60. If it is determined that the VTR is not in the timer recording mode (NO), control repeats the processing of step S1. If it is determined that the VTR is in the recording mode (YES), control proceeds to step S2.

At step S2, it is first checked, based on the VTR power on/off information supplied via terminal 61, the power source of VTR is on. If it is determined that the power source of VTR is not ON (NO), control repeats the processing of step S2. If it is determined that the power source of VTR is ON (YES), control proceeds to step S3.

At step S3, control causes a main power source control signal controlling the main power source of the receiver ON via terminal 63 to turn on the power source of the receiver before proceeding to step S4. At step S4, it is checked, based on the information from terminal 62 indicating that the VTR is in the recording mode. If it is determined that the VTR is not in the recording mode (NO), control repeats the processing of step S4. If it is determined that the VTR is in the recording state (YES), control proceeds to step S5.

At step S5, it is determined, based on a signal derived from the result of condition comparison, if descrambling has been made. If it is decided that descrambling has been made (YES), control proceeds to step S10 and, if it is determined that descrambling has not been made (NO), control proceeds to step S5.

At step S5, it is decided, based on the signal derived from the results of condition comparison from contract condition comparator 46 if descrambling has been made. If it is decided that descrambling has been made (YES), control proceeds to step A10 and, if it, has been determined that descrambling has not been made (NO), control proceeds to step S6.

At step S10, it is decided, based on the VTR power source on/off information supplied via terminal 61, if the power source of the VTR is ON. If it is determined that the VTR power source in ON (YES), control reverts to step S5 to repeat the operation of decision. If it is determined that the power source of VTR is not ON (NO), control proceeds to step S11. At step S11, a main power source control signal for controlling the main power source of the receiver OFF is outputted via terminal 63 to turn off the main power source of the receiver before the operation is terminated.

At step S6, an alarm sound control signal is sent via terminal 64 to the alarm signal pronunciation means, such as a speaker, to issue an alarm signal for indicating to the user that the descrambling has not been made. Similarly, at step S6, an operation stop control signal for stopping or aborting the recording operation is sent via terminal 66 to VTR. At step S6, a message information for indicating to the user that descrambling has not been feasible is sent to message storage means 67. The message information read out from message storage means 67 is displayed on display means on an operating panel of a television receiver, such as liquid crystal display means or LED display means, or a monitor screen of a television receiver.

After step S6, control proceeds to step S7 where it is checked, based on the VTR power source on/off information supplied via terminal 61, if the VTR power source is ON. If it is decided that the VTR power source is ON (YES), control proceeds to step S8 and, if the VTR power source is not ON (NO), control proceeds to step S12. At step S12, a main power source control signal for turning the main power source of the receiver OFF is outputted via terminal 63 for turning off the main power source of the receiver before the processing operation is terminated.

At step S8, it is decided, based on the signal derived from condition comparison from contract comparison circuit 46, if descrambling has been made. If it is determined that descrambling has been made (YES), control proceeds to step S9 and, if it is determined that descrambling has not been made (NO), control reverts to step S7.

At step S9, an operation start control signal for starting the recording operation of the VTR is transmitted via terminal 65. At step S9, an alarm sound control signal is transmitted via terminal 64 for terminating generation of the alarm sound by the alarm sound pronunciation means.

The VTR timer recording mode information is supplied to the alarming circuit 47 as described above. Alternatively, the VTR being in the timer recording mode may also be set on the alarming circuit 47. When the VTR is in the timer recording mode and the power source of the VTR is turned ON, the main power source of the receiver may be turned on. The alarming circuit 47 may perform a series of operations of generating an alarm sound, terminating the operation of the VTR or displaying a message to the effect that descrambling has not been made when it is sensed that the VTR is in the recording state and descrambling has not been made. As long as the VTR power source in ON, the alarm circuit 47 repeats checking as to if descrambling has been made, and causes the VTR recording to be started when descrambling has been made.

Meanwhile, in the embodiment illustrated, a signal indicating that the power source of VTR is ON or recording is being made by VTR may be outputted by VTR itself by so-called wired SIRCS or by a separate timer operated responsive to the VTR recording time. Alternatively, changed in the current consumption by VTR may be sensed by the receiver to sense that the VTR power source is ON or recording is being made by VTR for making a decision as to the recording state of the VTR or the ON state of the VTR power source.

Although the description of the first embodiment has been made in connection with the satellite broadcasting tuner, the above also applies to a VTR having an enclosed satellite tuner.

Besides, in the first embodiment, description has been made by taking an example of the combination of a satellite broadcasting receiver and the VTR. However, a combination of a PCM audio broadcasting receiver as receiver and a digital audio tape (DAT) as recording means, may also be employed, as in the second embodiment which is hereinafter explained.

Figure 3:
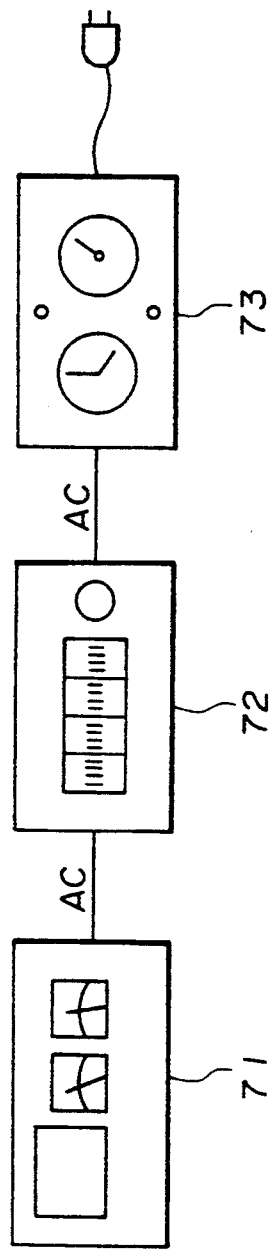
FIG. 3 illustrates the relation between the recorder, timer and the receiver in a second embodiment of the present invention.

Referring to FIG. 3, when timer recording of audio broadcasting, that is, so-called absence care-taking recording of audio signals, using a recorder 71, such as DAT recorder or cassette tape recorder, a timer (audio timer 73) is usually employed for turning on/off the audio broadcasting receiver (tuner) 72 and the recorder 71.

Figure 4:
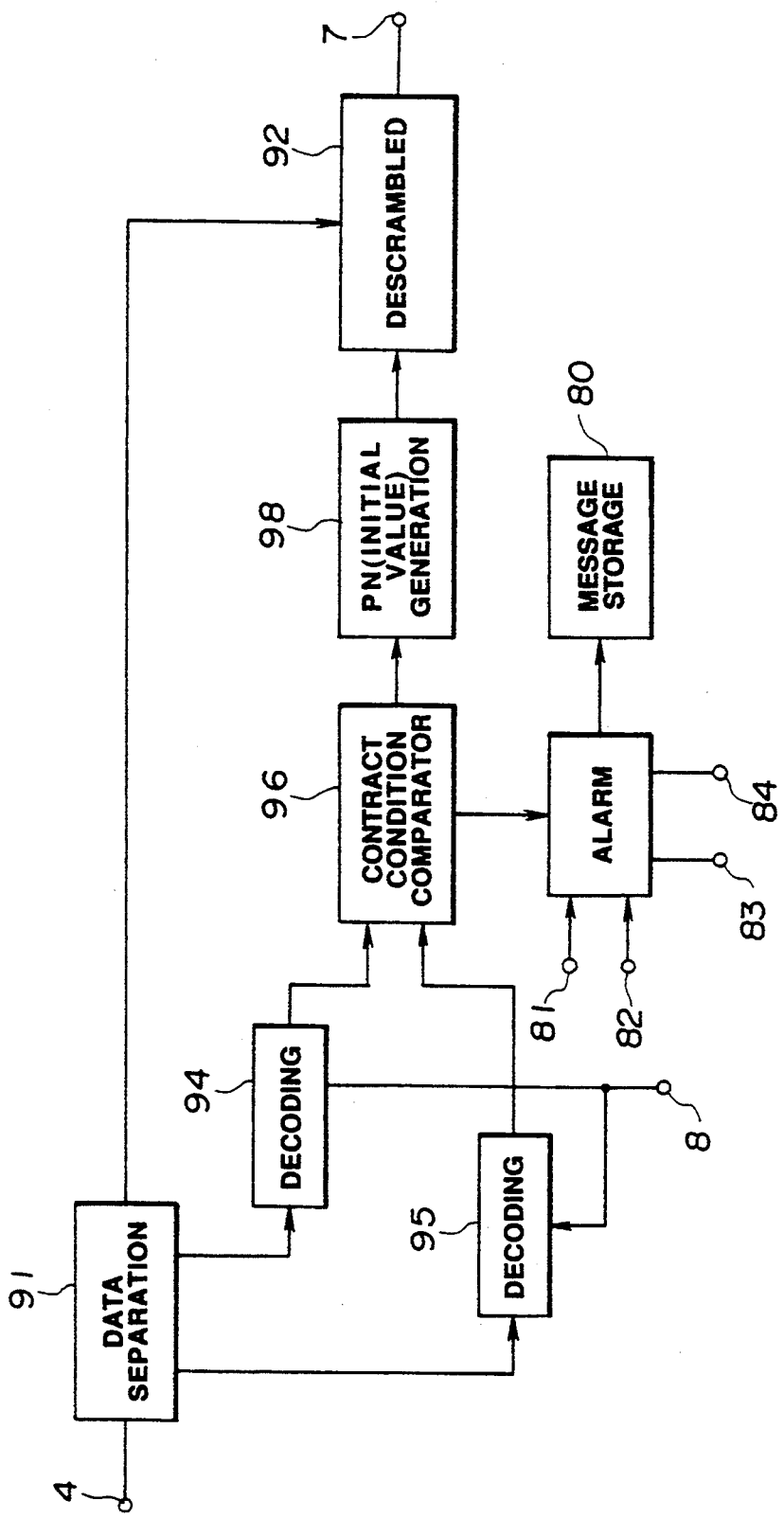
FIG. 4 is a block circuit diagram showing a schematic arrangement of a receiving apparatus according to the second embodiment of the present invention.

The audio broadcasting receiver of the second embodiment is a receiver for receiving scrambled transmission signals (chargeable audio broadcasting signals) for supplying the received signals to the recorder 71 (DAT recorder not shown in FIG. 4) connected thereto via terminals 7, 84, as shown in FIG. 4, and is made up of a descrambling circuit (descrambler) 92 for descrambling the scrambled transmission signals, a contract condition comparator circuit 96 for checking if descrambling is feasible, and an alarming circuit 97 for controlling the operation of the recorder 71 based on the results of decision by the contract condition comparator 96 and for visually and/or audibly indicating the results of decision to the user.

Meanwhile, in the present embodiment, the terminal 7 of the receiver is connected to the voice input terminal of the recorder 71.

In FIG. 4, reception signals of PCM voice broadcasting signals are supplied to terminal 4 via an antenna, not shown, so as to be supplied to a data separating circuit 91. In the data separating circuit 91, voice data in the reception signals are separated from data of the pertinent information which is the information for controlling the chargeable information and scrambling keys. The separated voice data are supplied to descrambler 92.

In the data separation circuit 91, data of the personal information and data of the common information are separated from each other in the data of the pertinent information. The data of the personal information is transmitted to the decoder 95, while the data of the common information is transmitted to decoder 94. These decoders 94, 95 decode the common information and the personal information supplied thereto on the basis of the master key information supplied to the receiver (or user) via terminal 8.

The data of the common information and the personal information, supplied via decoders 94, 95, are transmitted to contract condition comparator circuit 96 where an operation of deciding whether or not the received signals can be descrambled by the descrambler 92. In the contract condition comparator 96, an operation of comparing the contract conditions as to whether or not the above-mentioned conditions of reception conditions coincide with the common information and the personal information.

If the results of comparison indicate that the above-mentioned conditions of reception conditions coincide with the common information and the personal information, the contract condition comparator 96 transmits an initial value of the PN code to PN generator 98 generating the pseudo-random (PN) signal series. Based on the initial value, the PN generator 98 generates the PN signals to transmit the generated signals to descrambled 92.

The descrambler 92 descrambles the voice data supplied thereto on the basis of the PN signals. The descrambled voice data is transmitted via terminal 7 to recorder 71.

The contract condition comparator circuit 96 transmits signals derived from the results of condition comparison to alarming circuit 97. Based on the results of decision by the contract condition comparator 96, the alarming circuit 97 controls the operation of the recorder connected thereto, while allowing the user to recognize the results of decision visually or audibly.

If, with the recorder 71 being in the recording mode, the result of decision by contract condition comparator 96 is NO, that is if the result of contract comparison indicate non-coincidence, with the VTR being in e.g. the recording mode, the alarming circuit 47 indicates to the user that the descrambling has not been possible on display means as the visual indication, or issues e.g. an alarming sound from pronunciation means, for audio recognition. The alarming device also aborts the recording operation by VTR. Besides, if, with timer recording mode being set and the recording time being previously set on audio timer 73 and with the time set on timer having elapsed and the power being supplied to recorder 71 to initiate recording on the recorder 71, the results of decision of condition comparison is NO, the alarming circuit 97 causes interruption of the power supply from audio timer 73 to recorder 71.

To this end, the alarming circuit 97 of the present embodiment generates alarm sound controlling signals controlling alarm sound, such as a speaker, to transmit the alarm sound via terminal 83 to the alarm sound pronunciation means. Besides, the alarming circuit 97 generates the message information indicating that the descrambling has not been possible to the user to transmit the message information to message storage means, while also generating an operation stop control signal for causing supply of the power from audio timer 73 to recorder 71 to output the operation stop control signal via terminal 84. On the other hand, timer recording mode setting information is supplied via terminal 81 to alarming circuit 97 so that the timer-set recording appointment time information is supplied via terminal 82.

Figure 5:
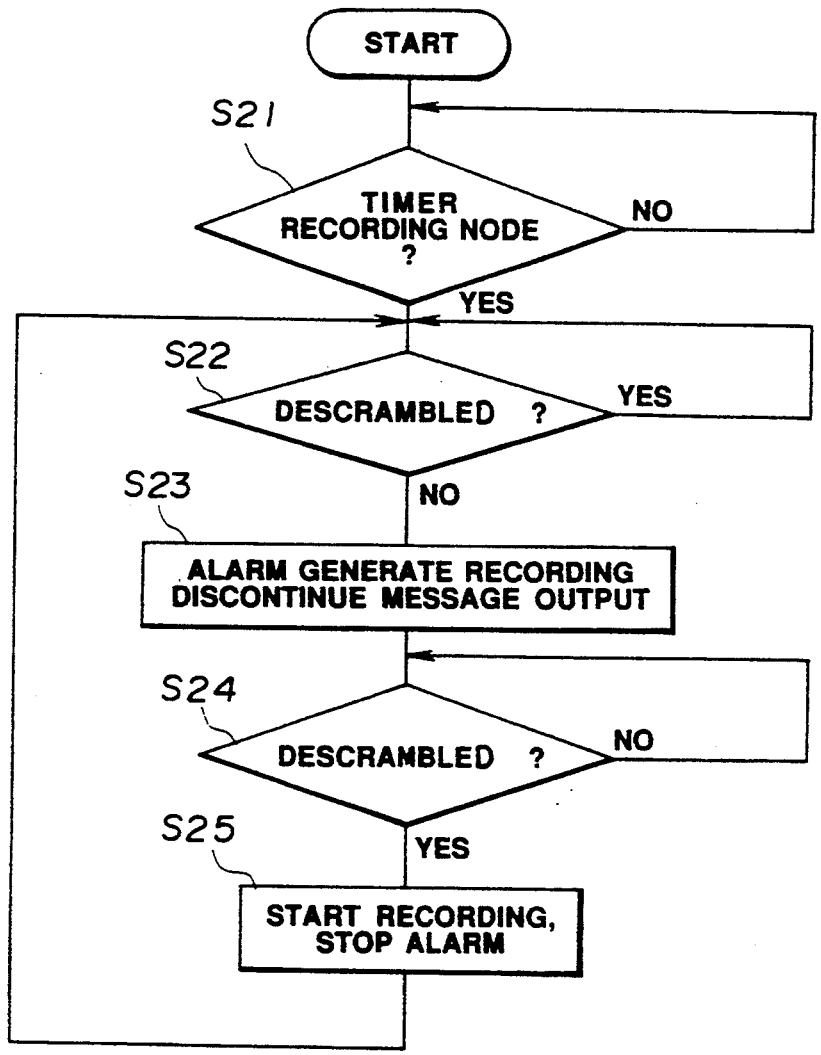
FIG. 5 is a flow chart showing the operation of an alarming circuit in the second embodiment of the present invention.

In the alarming circuit 97, an operation as shown in a flow chart shown in FIG. 5 is carried out. This flow chart shows the processing in which the timer recording mode is set.

Referring to the flow chart of FIG. 5, it is decided at step S21, based on the timer recording mode information supplied via terminal 81, if the timer recording mode is set. If it is determined that the timer recording mode is not set, that is if the result of decision at step S21 is NO, control repeats the operation of the step S21. If it is determined that the timer recording mode is set, that is if the result of decision at step S21 is YES, control proceeds to step S22.

At step S22, it is decided, based on signals derived from the results of condition comparison from contract condition comparator 96, whether or not scrambling has been made. If is decided that descrambling has been made, that is if the result of decision is YES, control repeats the processing of step S22. Conversely, if it is decided that descrambling has not been made, that is if the result of decision is NO, control proceeds to step S23.

At step S23, an alarm sound control signal is supplied via terminal 83 to alarm sound pronunciation means, such as a speaker, for producing an alarm sound by the alarm sound pronunciation means to the effect that descrambling has not been made. At step S23, an operation stop control signal for discontinuing power supply from audio timer 73 to recorder 71 to terminate recording is also outputted via terminal 84. At step S23, message information is also transmitted to the message storage means 80 for indicating to the user that descrambling has not been feasible. The message information read out from the message storage means 80 is displayed on, for example, liquid crystal display means and LED display means on the operating panel of the receiver.

After step S23, control passes to step S24. At step S24, it is decided, based on a signal derived from condition comparison by contract condition comparator 96, whether or not descrambling has been made. If it is decided that descrambling has not been made, that is if the result of decision is NO, control repeats the operation of step S23. If it is decided that descrambling has been made, that is if the result of decision is YES, control repeats the operation of step S25.

At step S25, the power source from audio timer 73 is supplied to recorder 71 to start the recording by the recorder 71. At step S25, the alarm sound control signal is transmitted via terminal 83 to the alarm sound pronunciation means, such as speaker, for discontinuing the generation of the alarm sound by the alarm sound pronunciation means.

In the above-described second embodiment, if the appointment time for absence take-care recording has expired and the power source from audio timer 71 is supplied to turn on the power source of the receiver (tuner), with the timer recording mode being set, it is checked whether or not descrambling of the reception signals can be made. If the descrambling can not be made, a series of operations such as generation of the alarm sound to cause the recording to cease and message outputting are carried out to wait until descrambling actually occurs. When descrambling occurs actually, the power source from audio timer 71 is transmitted to recorder 71 for starting the recording. In this manner, recording start and stop are performed by turning the power source to recorder 71 on and off. The above-described sequence of operations comes to a close by the audio timer 73 interrupting the power supply to the receiver of the present embodiment.

It will be seen from above that, since the descrambled state can be recognized by the user by warning in the form of an alarm so that the user present on the scene can readily take suitable measures. If the user is not present on the scene, recording is discontinued, at the same time that there remains a message to the effect that recording has been aborted, so that the tape or head of the VTR are not used wastefully, while the user is apprized of what happened at a later time.

What is claimed is:

1. A receiving apparatus comprising:
   receiving means for receiving scrambled signals;
   recording apparatus connected thereto;
   descrambling means connected to said receiving means for descrambling said scrambled signals if possible;
   decision means responsive to said scrambled signals for deciding whether or not said scrambled signals are susceptible to descrambling; and
   controlling means responsive to said decision means for controlling a recording operation of said recording apparatus based on the results of decision by said decision means.

2. The receiving apparatus as defined in claim 1 wherein said controlling means is configured to receive a signal indicating the current state of said recording apparatus and to control the operation of said recording apparatus based on said signal indicating the current state and results of decision by said decision means.

3. The receiving apparatus as defined in claim 1 wherein said controlling means is configured to determine the current operating state of said recording apparatus based on sensed changes in current consumption by said recording apparatus and to control operation of said recording apparatus based on the results of the decision by said decision means and the results of judgement of a current operating state.

4. A receiving apparatus comprising:
   receiving means for receiving scrambled signals;
   recording apparatus connected thereto;
   descrambling means connected to said receiving means for descrambling said scrambled signals if possible;
   decision means responsive to said scrambled signals for deciding whether or not said scrambled signals are susceptible to descrambling; and
   recognition means responsive to said decision means for enabling at least one of visual and audible recognition of the results of decision by said decision means.

5. The receiving apparatus as defined in claim 4 further comprising:
   audible alarm means for issuing an alarm sound,
   said recognition means producing an alarm sound from said audible alarm means to facilitate audible recognition of an alarm condition.

6. The receiving apparatus as defined in claim 4 further comprising:
   display means for displaying message information,
   said recognition means displaying said message information on said display means to facilitate visual recognition of an alarm condition.

7. A timer recording method for recording of descrambled signals based on a preset timing, comprising the steps of:
   detecting a timer recording mode;
   deciding whether or not descrambling has been effected when the timer recording mode is detected;
   if descrambling has been effected, recording the descrambled signals; and
   if descrambling has not been effected, carrying out at least one of the steps of issuing an alarm, starting then aborting the recording, and issuing a message.

8. The timer recording method as defined in claim 7 further comprising the steps of:
   determining again if descrambling has been effected and
   effecting at least one of (a) terminating the alarm and (b) starting recording when descrambling has been effected.

9. A recording method for recording signals descrambled from scrambled signals if descrambling is feasible, comprising the steps of:
   determining whether descrambling is feasible;
   determining whether the recording process is proceeding;
   deciding if descrambling has been effected if descrambling is feasible and the recording process is proceeding; and
   if descrambling is not feasible and the recording process is proceeding, carrying out at least one of the steps of issuing an alarm, discontinuing recording, and issuing a message that descrambling is not feasible.

* * * * *